United States Patent [19]

Gorog et al.

[11] Patent Number: 5,120,092
[45] Date of Patent: Jun. 9, 1992

[54] APPARATUS TO PROVIDE A THREADED COUPLING FOR A BROKEN PIPE

[76] Inventors: Tibor Gorog, 8306 Wilshire Blvd., No. 203, Beverly Hills, Calif. 90211; Frank Turi, 3959 Tropical Dr., Studio City, Calif. 91604

[21] Appl. No.: 684,436

[22] Filed: Apr. 11, 1991

Related U.S. Application Data

[63] Continuation of Ser. No. 562,801, Aug. 6, 1990, abandoned.

[51] Int. Cl.5 .............................................. F16L 55/18
[52] U.S. Cl. ...................................... 285/15; 285/353; 285/330; 285/414
[58] Field of Search ................... 285/353, 15, 91, 330, 285/404, 423, 414, 388, 356

[56] References Cited

U.S. PATENT DOCUMENTS

| | | | |
|---|---|---|---|
| 1,873,621 | 8/1932 | Moore | 285/356 X |
| 2,220,771 | 11/1940 | McHugh | 285/356 X |
| 2,454,356 | 11/1948 | Thornhill | 285/368 X |
| 3,185,501 | 6/1965 | Bowan | |
| 3,290,427 | 9/1966 | Newcomer | |
| 3,545,794 | 7/1970 | Wise | |
| 3,596,933 | 7/1971 | Luckenbill | |
| 3,733,093 | 4/1973 | Seiler | |
| 3,809,413 | 11/1974 | Boisserand | |
| 4,068,863 | 2/1978 | Lasko | |
| 4,183,560 | 10/1980 | Wyss | |

FOREIGN PATENT DOCUMENTS 0401406 12/1967 Australia ................ 285/353

Primary Examiner—Dave W. Arola
Assistant Examiner—Heather Chun
Attorney, Agent, or Firm—Lalos & Keegan

[57] ABSTRACT

An apparatus to provide a threaded coupling for a pipe to enable the pipe which has had its threads broken to be joined to a mating threaded pipe. The threaded coupling permits the coupling to be affixed to the pipe when the pipe is located in a difficult to reach area. The invention is used with a pipe which has been broken in a house wall and it is desired to not have to rip out the entire wall to get at the pipe. A transverse opening is drilled in the pipe after a small section of wall adjacent the threaded end has been removed and a pin inserted into the opening. Thereafter, a collar with a recessed wall to accommodate the head of the pin and a shelf to abut the head of the pin serves to form a secure retaining means onto which a gasket to seal leaks and a pressing ring for engagement with a mating coupling is affixed so that the broken pipe can be joined to a mating pipe.

30 Claims, 1 Drawing Sheet

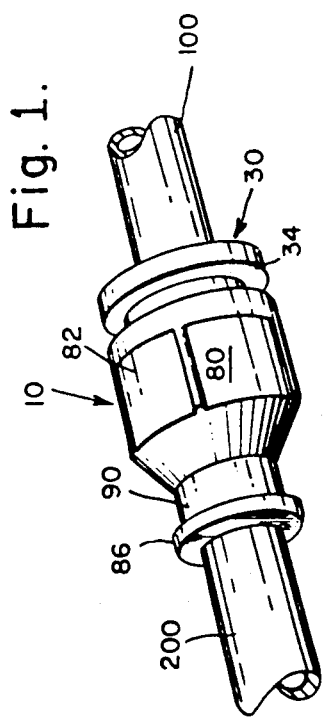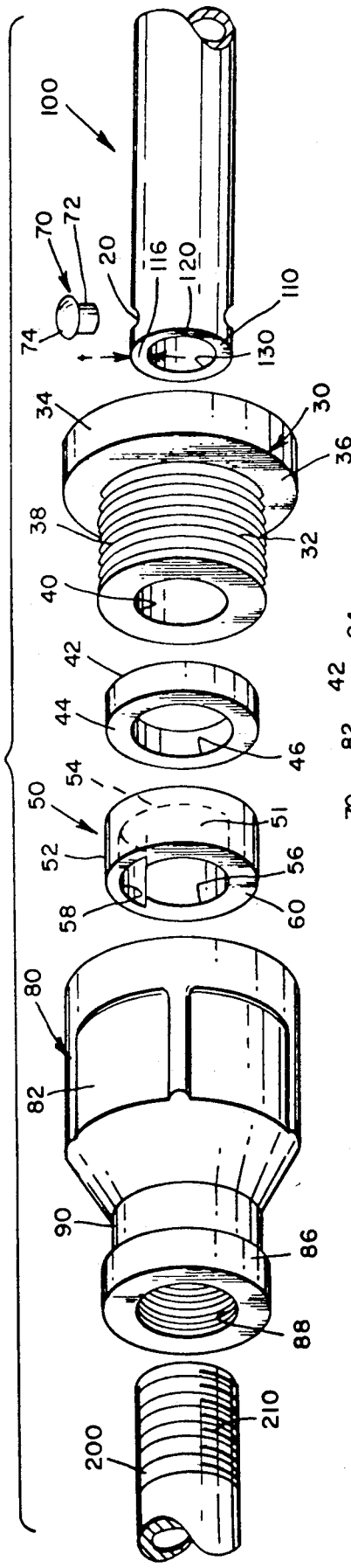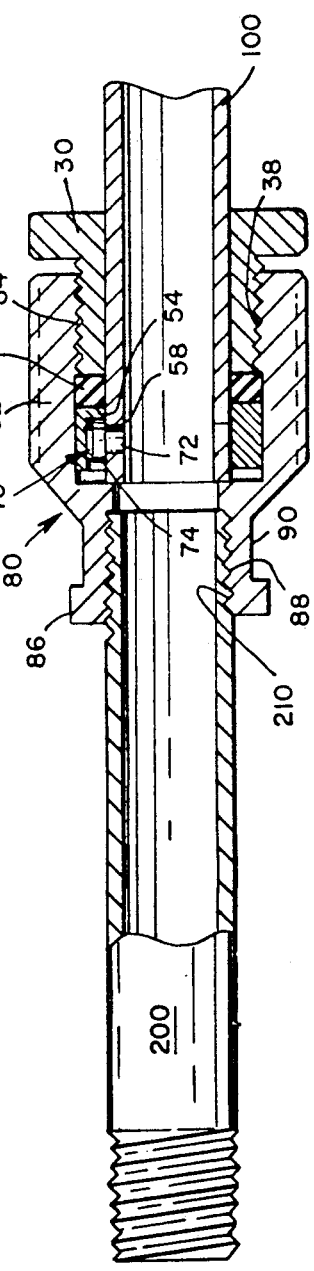

APPARATUS TO PROVIDE A THREADED COUPLING FOR A BROKEN PIPE

This is a continuation of copending application Ser. No. 07/562,801 filed on Aug. 6, 1990, now abandoned.

BACKGROUND OF THE INVENTION

1. Field of the Invention

The present invention relates generally to pipe joint seals for coupling adjacent ends of aligned pipe sections. More particularly, the present invention relates to apparatus which are used to connect the end of a broken piece of pipe whose threads have been broken and further a pipe which is located in a generally difficult to reach area such as the wall of a house, to thereby render the pipe operative without the necessity of breaking open the entire wall to remove the pipe and replace it.

2. Description of the Prior Art

In general, pipe joint seals for coupling adjacent ends of aligned pipe sections are known in the prior art. The following patents are representative of the known prior art:

1. U.S. Pat. No. 3,596,933 issued to Luckenbill on Aug. 3, 1971 for "Joint For Plastic Pipe".
2. U.S. Pat. No. 3,733,093 issued to Seiler on May 15, 1973 for "Pull And Push Safety Device For Screw Socket Connections Of Pipes".
3. U.S. Pat. No. 3,809,413 issued to Boisserand on May 7, 1974 for "Device For The Connection Of Cylindrical Members".
4. U.S. Pat. No. 4,183,560 issued to Wyss on Jan. 15, 1980 for "Arrangement For Making A Spigot-And-Socket Joint Secure From Sliding".
5. U.S. Pat. No. 4,068,863 issued to Lasko on Jan. 17, 1978 for "Pipe Joint".
6. U.S. Pat. No. 3,185,501 issued to Bowan et al. on May 25, 1965 for "Electrical Insulating Pipe Coupling".
7. U.S. Pat. No. 3,290,427 issued to Newcomer on Dec. 6, 1966 for "Deep Sea High Pressure Cable Entry".
8. U.S. Pat. No. 3,545,794 issued to Wise on Dec. 8, 1970 for "Compression Joint".

U.S. Pat. No. 3,809,413 to Boisserand discloses a device which has a pair of smooth wall tubes which are screwed together. Specifically, a deformable ring "3" is placed in a groove inside male member "2" and a nut "5" is then freely moved over the male member so that it provides threads on its outer surface. The female member pipe "1" is then screwed onto the outer surface of the nut "5" so that the ring "3" provides a seal between the two members "1" and "2" as well as the nut "5".

U.S. Pat. No. 4,183,560 to Wyss shows a spigot and socket joint which includes a sealing ring "6" and a placement ring "8" to help the threaded members become screwed together. However the embodiment requires the use of clamping members "11" and "12" so that the two pipes are clamped together. This is a much less efficient process although use of the rings "6" and "8" is disclosed.

U.S. Pat. No. 4,068,863 to Lasko discloses a pipe joint to fit together a thin walled steel pipe "12" and a companion fitting part "14" having threads on its internal surface. A packing ring "21" is fitted between the two pipes. The pipe includes an annular groove "20" near one end in which there is received a compression ring "22". Also provided is a compression nut "30" including a sleeve part "32" having external threads "34" which engage the internal threads "18" of the mating pipe. The nut is held in place relative to the pipe against the packing ring which is in the groove.

U.S. Pat. No. 3,596,933 to Luckenbill discloses a joint for a plastic pipe wherein the joint "10" includes two moveable members which is a body member or fitting "12" and a follower member "14". An annular gasket seal "18" is between them.

U.S. Pat. No. 3,733,093 to Seiler shows means for interconnecting a pair of pipes.

U.S. Pat. No. 3,185,501 to Bowan discloses an electrical insulating pipe coupling.

U.S. Pat. No. 3,290,427 to Newcomer discloses a deep sea high pressure cable entry having various interconnecting members with sealing rings between them. In each case the design is to have various shoulders that abut the male threaded member and prevent it from going further after it is screwed onto the female member which is exterior to it.

U.S. Pat. No. 3,545,794 issued to Wise discloses a compression joint. In this case, the member "14" has an internal groove for receiving the smooth pipe "12" which abuts against an interior shoulder. A locking ring "26" is disposed between an exterior nut "20" which slides on the smooth pipe "12" and is threaded onto the interior pipe "14".

In general, all of the prior art discloses various arrangements for interconnecting two pipes. A principal disadvantage of all of the prior art arrangements is that it is absolutely necessary to have easy access to both pipes in order to create and join the interfitting elements. There is a significant need for a system and apparatus which enables two pipes to be joined in a difficult to reach area and further enables them to be joined when the threads of one of the pipes has been broken and has become inoperable.

SUMMARY OF THE PRESENT INVENTION

The present invention relates to an apparatus to provide a threaded coupling for a pipe to enable the pipe which has had its threads broken to be joined to a mating threaded pipe. The present invention further relates to such a threaded coupling which permits the coupling to be affixed to the pipe when the pipe is located in a difficult to reach area.

It has been discovered, according to the present invention, that if a pipe which has been broken in a house wall must be refurbished for use and it is desired to not have to rip out the entire wall to get at the pipe, then a transverse opening can be drilled in the pipe after a small section of wall adjacent the threaded end has been removed and a pin inserted into the opening. Thereafter, a collar with a recessed wall to accommodate the head of the pin and a shelf to abut the head of the pin serves to form a secure retaining means onto which a gasket to seal leaks and a pressing ring for engagement with a mating coupling can be affixed so that the broken pipe can be joined to a mating pipe.

It has further been discovered, according to the present invention, that with a retaining means comprising a pin inserted into the transverse opening drilled into the pipe wall adjacent the broken end of the pipe, a coupling can be inserted onto the broken pipe without the necessity of breaking open the entire wall concealing the pipe.

It has additionally been discovered, according to the present invention, that with the drilled opening and transverse pin retaining a collar, a sealing gasket and pressing ring can be inserted onto the the pipe and retained by the supported collar such that a second coupling member can be threaded onto the first retained coupling member for purposes of enabling a second mating pipe to be threaded into the second coupling member.

It is therefore an object of the present invention to provide a coupling member for insertion on a broken pipe whose threads have been broken and which is located in a difficult to reach location such as the wall of a building, with the object being to insert and retain the coupling on the broken pipe without having to rip open extensive portions of the wall behind which the broken pipe rests.

It is a further object of the present invention to provide a simple retaining means which can be easily affixed to a broken pipe in a difficult to reach location so that the retaining means can support and retain under pressure a threaded coupling to provide a means for coupling the broken end of the pipe to a second pipe so that the broken pipe becomes operable and usable It is another object of the present invention to provide a means for affixing a threaded coupling to a broken pipe in a difficult to reach location without having to remove the broken pipe and without having to remove any substantial covering wall portion which conceals the broken pipe.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of the present invention apparatus to provide a threaded coupling for a pipe in its assembled form and joining the end of a broken pipe and the end of a regular threaded pipe.

FIG. 2 is an exploded view of the present invention apparatus to provide a threaded coupling for a pipe showing the elements of the present invention and how they interrelate to both the broken pipe and the new threaded pipe to be joined to the broken pipe through the present invention coupling.

FIG. 3 is a longitudinal cross-sectional view of the present invention apparatus to provide a threaded coupling for a pipe showing the elements of the present invention and how they interrelate to both the broken pipe and the new threaded pipe to be joined to the broken pipe through the present invention coupling.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Referring particularly to FIG. 2, the creation of the present invention coupling means 10 is clearly disclosed. Initially, an end 110 of a pipe 100 has been broken. It is assumed that pipe 100 is located in a difficult to reach area such as behind the wall of a structure such as a house or office building. In the case of an old house, the shearing of the end 110 of a pipe 100 is very common. It is not desirable to remove the old pipe 100 because once pipes and things are removed, the amount of damage to other pipes and coupling members is unknown and the project of repair may be very greatly expanded. Therefore, it is preferable and desirable to retrofit the old pipe 100 whose end 110 has been broken so that it is usable. A second problem is that it is preferable to not damage and rip out much of the wall which conceals the pipe 100. Although the end 110 is shown smooth in FIG. 2, it can also be jagged. Any threads on the pipe surface 120 have been broken, either through wear or damage, and therefore the pipe 100 in its present condition is unusable.

Referring to both FIGS. 2 and 3, the first step of the present invention is to open a small section of the wall of the house covering the pipe 100 adjacent its broken end 110 and drill a transverse opening 20 which extends through the thickness "t" of the wall 116 of pipe 100. It is not necessary that the opening extend through the opposite side of the pipe wall 116. Although in FIG. 2, the opening 20 is shown extending through both walls, it is sufficient if the transverse opening 20 extends through one side of the pipe wall 116 adjacent the opening in the wall of the house which has been made to reach the broken end 110 of pipe 100. After the transverse opening 20 is drilled in the pipe wall 116, a pressing ring 30 is slid onto broken pipe 100 so that it surrounds surface 120 and is pushed beyond the area of transverse opening 20. The pressing ring 30 comprises a threaded shaft 32 and a flat disk 34 having an exposed transverse surface 36 facing the threads 38 on threaded shaft 32. Pressing ring 30 has a centrally disposed opening 40 which extends through the entire length of pressing ring 30 and is of sufficient diameter to enable the pressing ring 30 to be slid onto the pipe 100.

Next, a gasket 42 having a wall 44 and a centrally disposed opening 46 which is of sufficient diameter to enable the gasket 42 to be slid onto the pipe 100, is slid onto the pipe 100 so as to abut the pressing ring 30.

A key element of the present invention is a collar 50 which includes a cylindrical wall 52 which terminates at one end in a transverse shelf 54 which extends around the entire circumference of the collar 50 and extends into the interior 51 of collar 50. The interior wall 56 of cylindrical wall 52 comprises a recess 58 which extends for the length of the collar 50, beginning at one end 60 and extending to the transverse shelf 54. A pin 70 having a shaft 72 and a head 74 is designed to be inserted into the transverse opening 20 in pipe 100 such that shaft 72 rests within transverse opening 20 and may extend into the interior 130 of pipe 100 while head 74 rests on outer surface 120 of pipe 100 and extends transversely thereto. The recess 58 in interior wall 56 of metal collar 50 is designed to accommodate the head 74 of pin 70.

Therefore, after the gasket 42 is slid onto pipe 100, the metal collar 50 is slid onto pipe 100 and also is slid past the transverse opening 20. Then the pin 70 is inserted into transverse opening 20 such that the head 74 of pin 70 extends transversely to exterior surface 120 of pipe 100 as previously described. The collar 50 is then slid back down such that head 74 of pin 70 passes along and through recess 58 until the head 74 abuts the shelf 54. The gasket 42 then is slid back down to abut the opposite side of shelf 54 and the pressing ring 30 is then slid back down to abut the gasket 40.

A pipe coupling member 80 has a first cylindrical portion 82 which includes interior threads 84 and a second cylindrical portion 86 which also includes interior threads 88. The two portions are joined by interconnecting section 90. Pipe coupling member 80 is made of one piece construction. The threads 84 in first cylindrical portion 82 are sized to be accommodated by the threads 38 of pressing ring 30. The threads 88 in second cylindrical portion 86 are sized to be accommodated by the second pipe 200 to be joined.

After the pressing ring 30 is slid back down to abut gasket 42 as previously described, coupling member 80 is screwed onto pressing ring 30 to thereby form the joint coupling. Thereafter, second pipe 200 having threads 210 is threaded into threads 88 of second cylindrical portion 86 of coupling member 80.

Therefore, broken pipe 100 which previously was unusable and in a difficult to reach area has been made usable through the present invention and been made usable without having to tear apart the wall behind which the pipe 100 is located.

In the preferred embodiment, the gasket 42 is made of rubber or plastic. In the preferred embodiment, the collar 50 is made of metal such as stainless steel, brass or galvanized maleable iron. The pressing ring 30 is also preferably made out of metal such as stainless steel, galvanized maleable iron, or brass. Similarly, the coupling member 80 is preferably made out of metal such as stainless steel, galvanized maleable iron or brass. The pin 70 is preferably made out of metal such as stainless steel, galvanized maleable iron or brass. It is also possible for the pressing ring 30, coupling member 80, collar 50 and pin 70 to be made out of plastic.

The size of the present invention elements can be sized to fit any standard type of pipe dimension such as one-half inch, three-quarter inch, one inch, one and one-quarter inch, one and one-half inch and two inch diameters. By way of example, if the broken pipe 100 is a one-half inch diameter pipe, then the threads 38 of pressing ring 30 and the threads 84 of coupling member 80 are preferably one and one-quarter inch threads. Other pipe diameters can be similarly accommodated with larger diameter threads for the pressing ring 30 and coupling member 80.

The present invention has been illustrated with only one transverse opening 20 drilled into pipe 100 and one pin 70. Of course it is possible to drill the opening through the entire pipe so there are two oppositely disposed transverse openings so that two pins can be inserted, a respective one pin into each opening. This lends more strength and stability but is more difficult since it may be difficult to insert a second pin at the surface of the pipe remote from the wall opening.

It is also preferable that the threads 38 and 84 be fine threads such as 16 threads to the inch so that the coupling member 80 can be hand tightened onto the pressing ring 30.

Therefore, the present invention can be defined as an apparatus to provide a threaded coupling for a pipe broken at one end, having an outer surface and a wall having a thickness into which a transverse opening has been drilled in the pipe wall adjacent its broken end, comprising: (a) a pressing ring including a threaded shaft and a flat disk having an exposed transverse surface facing the threads on the threaded shaft and a centrally disposed opening extending through the entire length of the pressing ring and having sufficient diameter to be slid onto said pipe; (b) a gasket having a centrally disposed opening of sufficient diameter to enable the gasket to be slid onto said pipe; (c) a pin having a shaft and a head, the shaft dimensioned to fit into said drilled transverse opening in the wall of the pipe such that the head of the pin extends transversely to the outer surface of the pipe; (d) a hollow collar including a cylindrical wall which terminates at one end in a transverse shelf which extends around the entire circumference of the collar and extends into the hollow interior of the collar, the hollow collar further having an interior wall including a recess which extends from the end remote from the shelf to adjacent the shelf, the recess configured to accommodate the head of said pin and the interior of the hollow collar being of sufficient diameter to enable the collar to be slid onto said pipe; and (e) a coupling member having internal threads at one portion configured to accommodate the threads of said pressing ring and internal threads at a second portion configured to accommodate threads of a second pipe; (f) whereby said pressing ring is slid onto said pipe with the disk portion remote from said broken end, said gasket is slid onto said pipe and said collar is slid onto said pipe with its shelf adjacent the gasket, the pin is inserted into the drilled opening in the pipe such that the head of the pin extends transversely to the outer surface of the pipe and said collar is thereafter slid onto said head of said pin such that the head of the pin is inside the recess and abuts the shelf and said gasket abuts said shelf and said pressing ring abuts said gasket, and the coupling member is thereafter threaded onto said pressing ring and a second pipe is threaded into said coupling member.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. An apparatus to provide a threaded coupling for a pipe broken at one end, having an outer surface and a wall having a thickness into which a transverse opening has been drilled in the pipe wall adjacent its broken end, comprising:

a. a pressing ring including a threaded shaft and a flat disk having an exposed transverse surface facing the threads on the threaded shaft and a centrally disposed opening extending through the entire length of the pressing ring and having sufficient diameter to be slid onto said pipe;

b. a gasket having a centrally disposed opening of sufficient diameter to enable the gasket to be slid onto said pipe;

c. a pin having a shaft and a head, the shaft dimensioned to fit into said drilled transverse opening in the wall of the pipe such that the head of the pin extends transversely to the outer surface of the pipe;

d. a hollow collar including a cylindrical wall which terminates at one end in a transverse shelf which extends around the entire circumference of the collar and extends into the hollow interior of the collar, the hollow collar further having an interior wall including a recess which extends from the end remote from the shelf to adjacent the shelf, the recess configured to accommodate the head of said pin and the interior of the hollow collar being of sufficient diameter to enable the collar to be slid onto said pipe; and e. a coupling member having internal threads at one portion configured to accommodate the threads of said pressing ring and internal threads at a second portion configured to accommodate threads of a second pipe;

f. whereby said pressing ring is slid onto said pipe with the disk portion remote from said broken end, said gasket is slid onto said pipe and said collar is slid onto said pipe with its shelf adjacent the gasket, the pin is inserted into the drilled opening in the pipe such that the head of the pin extends transversely to the outer surface of the pipe and said collar is thereafter slid onto said head of said pin such that the head of the pin is inside the recess and abuts the shelf and said gasket abuts said shelf and said pressing ring abuts said gasket, and the coupling member is thereafter threaded onto said pressing ring and a second pipe is threaded into said coupling member.

2. An apparatus in accordance with claim 1 wherein said collar is made of metal.

3. An apparatus in accordance with claim 1 wherein said gasket is made of rubber.

4. An apparatus in accordance with claim 1 wherein said pressing ring is made of metal.

5. An apparatus in accordance with claim 1 wherein said pin in made of metal.

6. An apparatus in accordance with claim 1 wherein said coupling member is made of metal.

7. An apparatus in accordance with claim 1 wherein said collar is made of plastic.

8. An apparatus in accordance with claim 1 wherein said pressing ring is made of plastic.

9. An apparatus in accordance with claim 1 wherein said pin is made of plastic.

10. An apparatus in accordance with claim 1 wherein said coupling member is made of plastic.

11. An apparatus in accordance with claim 1 wherein the threads on said pressing ring are fine threads and the mating threads on the coupling member are fine threads.

12. An apparatus to provide a coupling for a first pipe broken at one end, said first pipe having an outer surface and a wall having a thickness into which a transverse opening has been added in said pipe wall adjacent its broken end, comprising:

a pin having a shaft and a head, the shaft dimensioned to fit into said transverse opening in said wall of said first pipe, a collar having an opening therein adapted to receive said head of said pin, a coupling member positioned on said first pipe and including internal threads at a portion thereof, said threads configured to accommodate threads of a second pipe, and a securing means for securing said coupling member to said first pipe and said collar such that when said pin and collar are positioned on said first pipe, said pin, collar and securing means prevent said coupling member from moving in the direction toward said second pipe, said securing means extending circumferentially continuously around said first pipe.

13. An apparatus according to claim 12, wherein said collar further includes a transverse shelf at one end thereof, said shelf extending around the entire circumference of the collar.

14. An apparatus according to claim 13, wherein said securing means is secured to said collar by abutting said transverse shelf.

15. An apparatus according to claim 12, wherein said opening in said collar adapted to receive said head of said pin comprises a recess extending along the length of an interior wall of said collar, said recess being configured to accommodate the head of said pin.

16. An apparatus according to claim 15, wherein when said head of said pin is disposed within said recess of said collar, said collar is prevented from moving in a direction toward said second pipe.

17. An apparatus according to claim 15, wherein said collar includes a transverse shelf at one end thereof, said recess extending along the length of said interior wall from said transverse shelf to the other end of said collar.

18. An apparatus according to claim 12, wherein said coupling member includes internal threads configured to accommodate external threads on said securing means.

19. An apparatus according to claim 12, wherein said securing means comprises a pressing ring cooperable with said coupling member.

20. An apparatus according to claim 19, wherein said coupling member includes internal threads configured to accommodate external threads on said pressing ring.

21. An apparatus according to claim 20, wherein said threads on said pressing ring are fine threads and said threads on the coupling member are fine threads.

22. An apparatus according to claim 19, wherein said pressing ring includes a threaded shaft and a transversely disposed flat disk, said pressing ring having a centrally disposed opening extending through the entire length thereof having a sufficient diameter to slide onto said pipe.

23. An apparatus according to claim 19, wherein said pressing ring is made of metal.

24. An apparatus according to claim 12, further comprising a gasket disposed between said securing means and said collar.

25. An apparatus according to claim 12, wherein said collar is made of metal.

26. An apparatus according to claim 12, wherein said collar is made of plastic.

27. An apparatus according to claim 12, wherein said pin is made of metal.

28. An apparatus according to claim 12, wherein said pin is made of plastic.

29. An apparatus according to claim 12, wherein said coupling member is made of metal.

30. An apparatus according to claim 12, wherein said coupling member is made of plastic.

* * * * *